(No Model.) 6 Sheets—Sheet 1.
J. MILLS.
BOLTING REEL.
No. 474,916. Patented May 17, 1892.
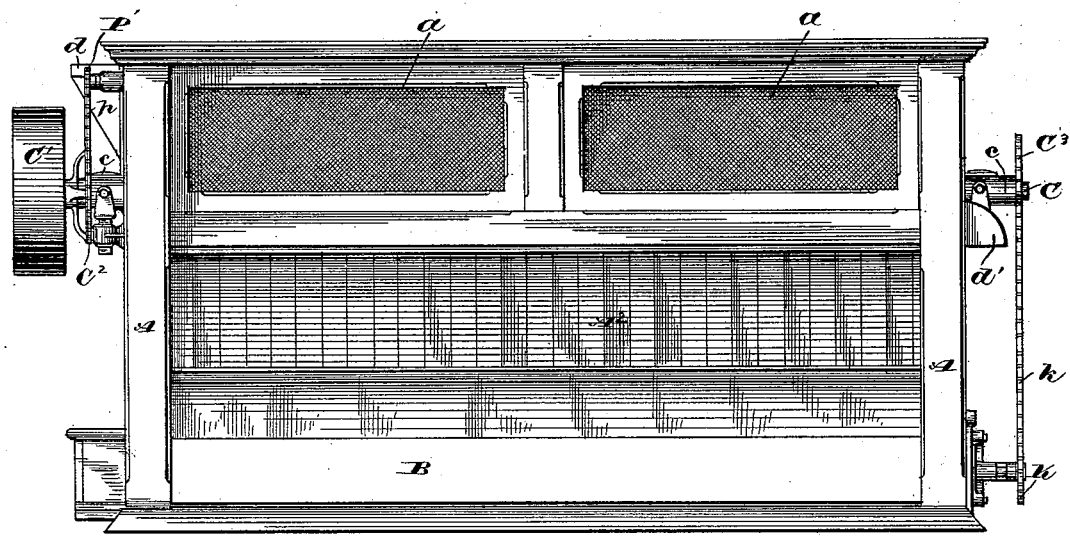
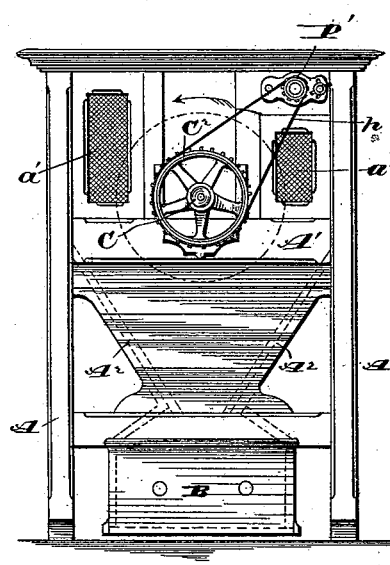
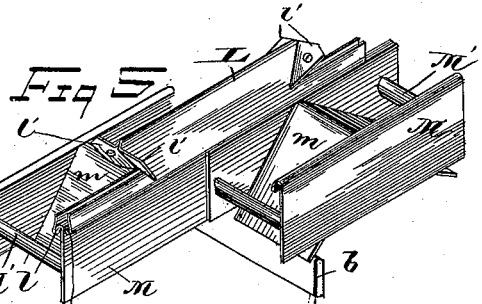
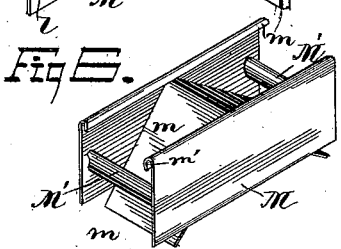
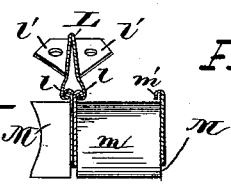
WITNESSES
INVENTOR
Jonathan Mills
Leggett & Leggett
Attorneys

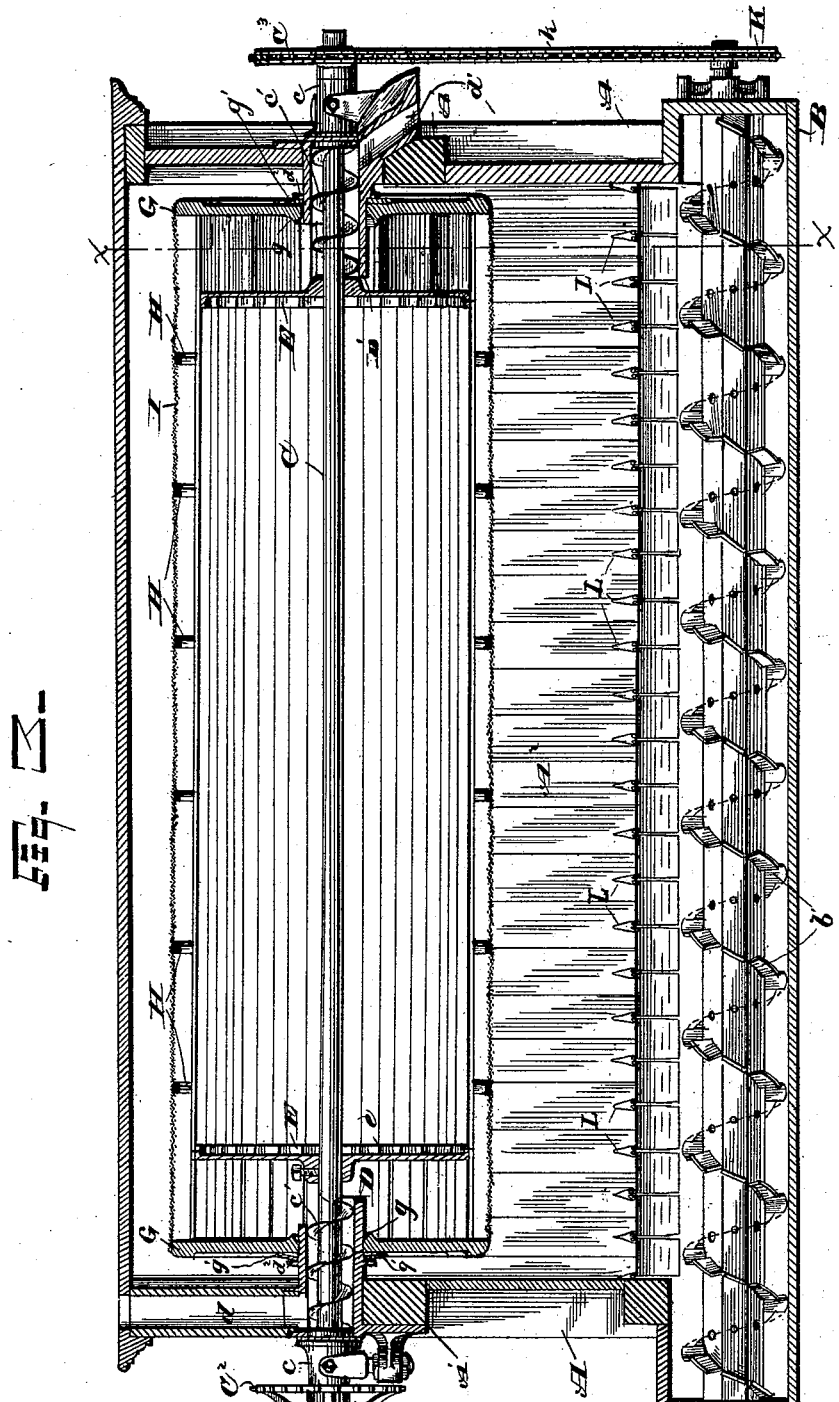

(No Model.) 6 Sheets—Sheet 3.

J. MILLS.
BOLTING REEL.

No. 474,916. Patented May 17, 1892.

WITNESSES
INVENTOR
Jonathan Mills
Attorneys (No Model.) 6 Sheets—Sheet 4.
J. MILLS.
BOLTING REEL.
No. 474,916. Patented May 17, 1892.
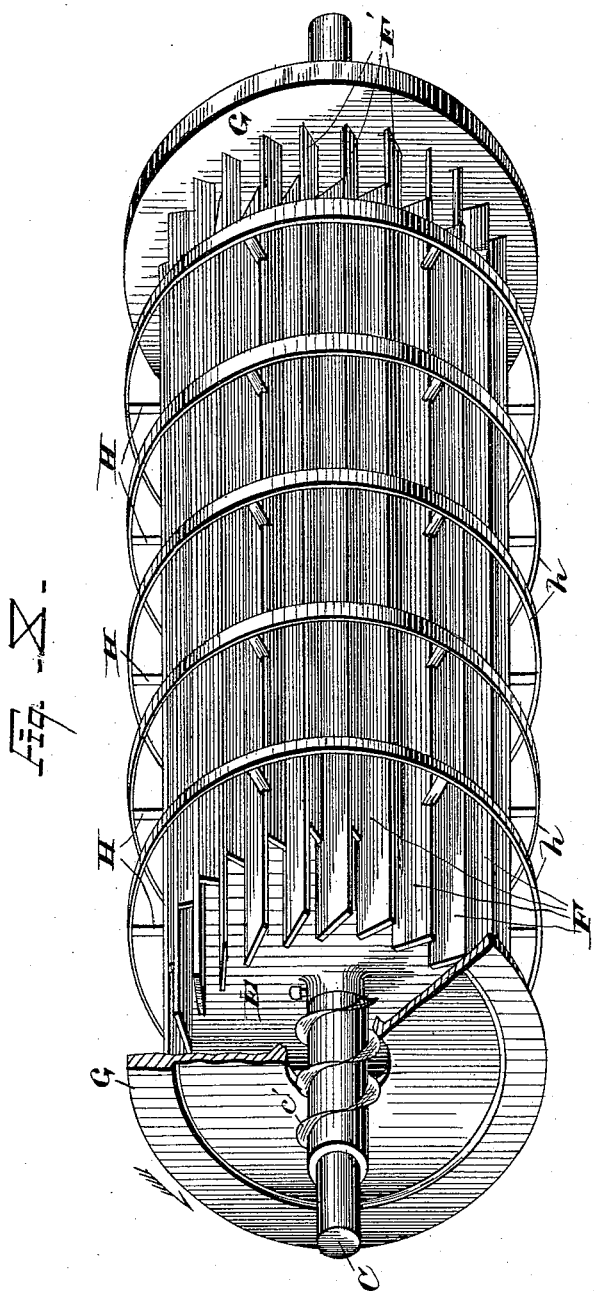
Fig. X.
WITNESSES
Wm. M. Monroe.
Geo. W. King.
INVENTOR
Jonathan Mills
Liggett & Leggett
Attorneys (No Model.) 6 Sheets—Sheet 5.
J. MILLS.
BOLTING REEL.
No. 474,916. Patented May 17, 1892.
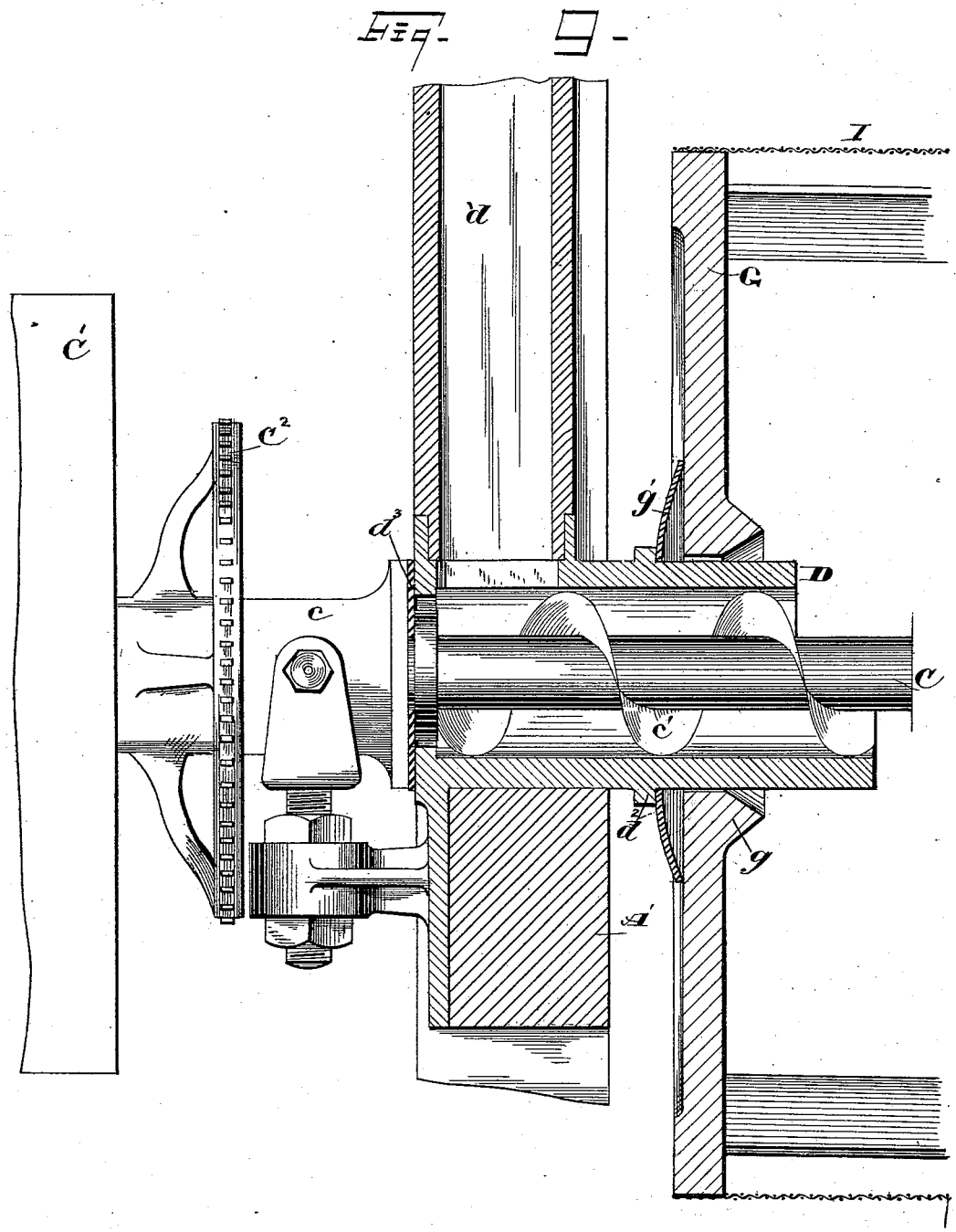
WITNESSES
Wm. M. Monroe.
Geo. W. King
INVENTOR
Jonathan Mills
by Leggett & Leggett
Attorneys (No Model.) 6 Sheets—Sheet 6.

J. MILLS.
BOLTING REEL.

No. 474,916. Patented May 17, 1892.

WITNESSES
Wm. M. Monroe.
Geo. W. King

INVENTOR
Jonathan Mills
by Leggett & Leggett
Attorneys

UNITED STATES PATENT OFFICE.

JONATHAN MILLS, OF CLEVELAND, OHIO.

BOLTING-REEL.

SPECIFICATION forming part of Letters Patent No. 474,916, dated May 17, 1892.

Application filed September 23, 1885. Serial No. 177,905. (No model.)

*To all whom it may concern:*

Be it known that I, JONATHAN MILLS, of Cleveland, in the county of Cuyahoga and State of Ohio, have invented certain new and useful Improvements in Bolting-Reels; and I do hereby declare the following to be a full, clear, and exact description of the invention, such as will enable others skilled in the art to which it pertains to make and use the same.

My invention relates to improvements in bolting-reels, in which the reel is provided with a core, preferably a hollow cylinder mounted on the reel-shaft, the periphery of said cylinder consisting of a series of longitudinal V-shaped ridges with the bolting-cloth stretched around and supported from the cylinder, but separated a short distance from the apices of the said ridges, the object being, by means of the said core and ridges, to arrest the flour that has been carried up by the motion of the bolting-cloth as it is in the act of falling back to the bottom of the reel and separate the falling flour and retain it in small quantities, and by means of the sloping sides of the ridges to return the flour to repeated contacts with the bolting-cloth, whereby a large area of the bolting-cloth that otherwise would be for the time being inoperative is made to do service, the result being a large increase in the bolting capacity of the reel, and by reason of the more frequent but less violent impact of the flour against the bolting-cloth not only more work but better work is done.

My invention relates, also, to the details of construction hereinafter more fully described, and the novel features pointed out in the claims.

Figure 4:
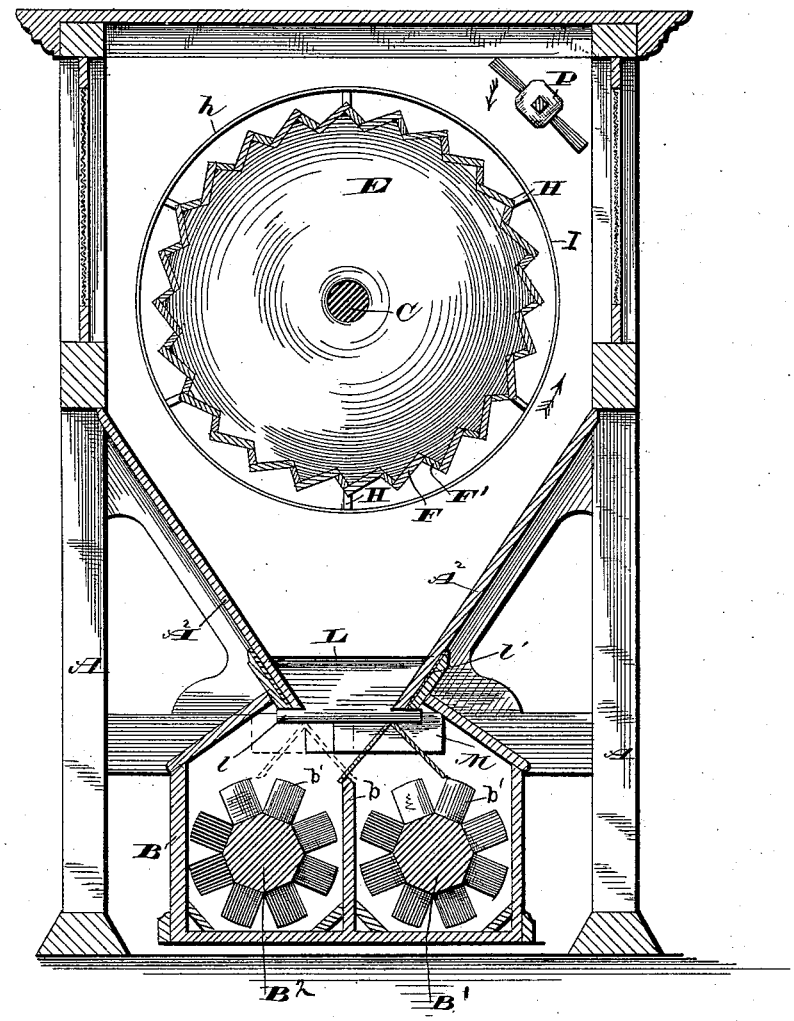
Figure 10:
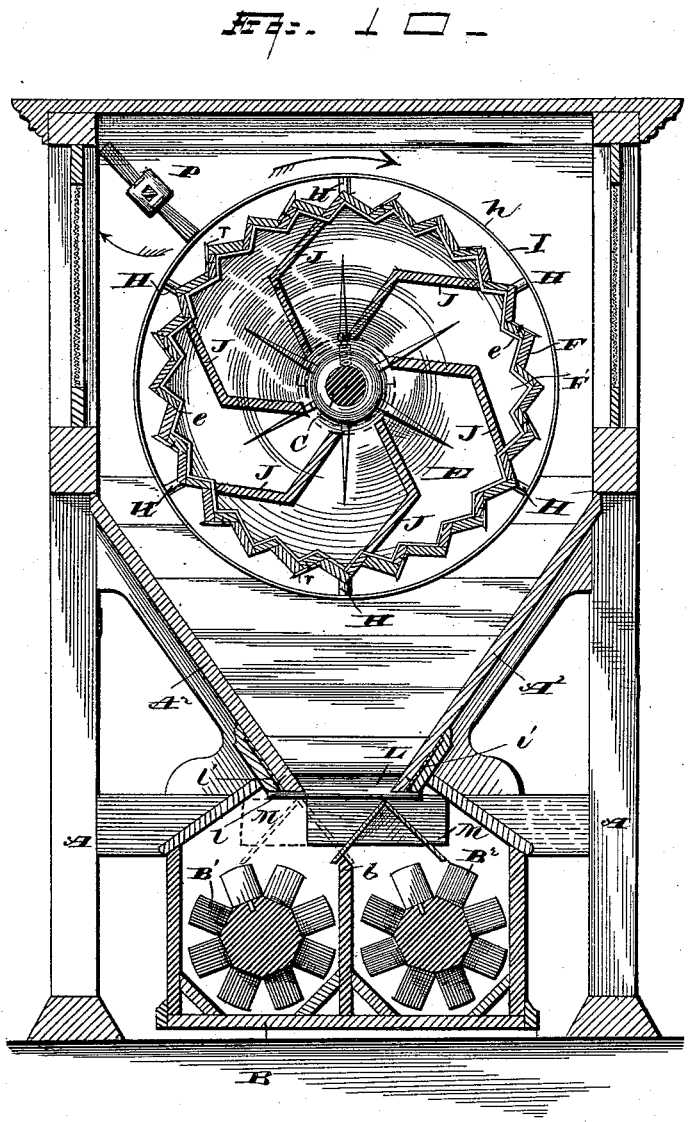

In the accompanying drawings, Figure 1 is a side elevation of my improved bolting-reel. Fig. 2 is an end elevation of the same. Fig. 3 is a longitudinal vertical section through the center of the reel. Fig. 4 is an elevation in transverse section through the central portion of Fig. 3, looking to the right hand. Fig. 5 is a view in perspective of two of the cut-off slides in reverse position, showing, also, the connecting-bridge. Fig. 6 is a view in perspective of one of the cut-off slides detached. Fig. 7 is an end view of a bridge, showing the manner of supporting the slide, portions of the latter being also shown. Fig. 8 is an enlarged view in perspective of the reel with the bolting-cloth removed. A portion of one head is broken away to show the other parts more clearly. Fig. 9 is an enlarged transverse section of one of the reel-heads and the adjacent parts of mechanism. Fig. 10 is a transverse section on the line $xx$, Fig. 3, looking toward the left hand.

A supporting frame-work consisting of posts A, bridge-trees A', and other suitable girders is provided, to which frame-work are attached side, top, and end walls, forming a rectangular casing for the reel, as shown in Figs. 1, 2, 3, and 4. The walls $A^2$, forming the under side of the casing, are inclined, and at their lower or converging edges join the conveyer-box B. The side walls have large openings covered with screens $a$, and the end walls in like manner have screen-covered openings $a'$, the object of such openings being to give a free circulation of air inside the casing to carry away any heat or vapor that may be given off from the flour.

C is the reel-shaft, and is journaled in suitable boxes $c$, which are secured to the bridge-trees A'. This shaft outside the journals has mounted thereon the driving-pulley C' and the sprocket-wheels $C^2$ and $C^3$.

D and D' are cylindrical spouts surrounding the reel-shaft and concentric therewith, the spouts being secured to the respective bridge-trees. The spout D has a hopper $d$, attached for feeding material to the reel, while the spout D' has a discharging-nozzle $d'$ for discharging tailings from the machine. The top sides of these spouts inside the reel are cut away, leaving semicircular troughs. The shaft C, inside the spouts, is provided with worms $c'$, the one worm for feeding the material along the spout D into the reel and the other worm for passing the tailings along the spout D' toward the exit from the machine.

E are flanged disks that are mounted on the shaft C and secured by set-screws. These disks are located the one a few inches from the inner end of the spout D and the other close to the inner end of the spout D'. These disks have angular peripheries, as shown more clearly in Figs. 4 and 10. Each disk has an overhanging or laterally-projecting rim $e$, through which screws pass that secure the wooden part of the reel-core. Strips F and F', preferably of wood on account of the cheapness and lightness of this material, are fastened to the rims e and are fastened at the edges to each other, forming tight joints, so that the cylinder between the disks has an imperforate surface. It will be seen that the contour of the wooden cylindrical structure corresponds with the peripherical configuration of the disks E, by reason of which the surface of the cylinder is made up of a series of longitudinal V-shaped ridges. At the head end of the machine the strips F support the head G, while at the tail (or, as shown in the drawings, right-hand) end the strips F' support the head G, the intervening strips F and F' at the respective ends having been cut away. (See Fig. 8.) These heads are of wood, and each has a circular opening in the center that fits as close as practicable around the respective spouts D and D'. Rings g, triangular in cross-section, are built out on the inside of the head around the central opening thereof. (See Fig. 9.) The inclined external surfaces of these rings carry the material away from the joints around the spouts. Whether the material is discharging from a spout into the reel or is falling from the periphery of the reel toward the spout, in either case the material, as aforesaid, is kept away from the joint around the spout.

Slight annular external ribs $d^2$ are formed on the spouts, and between the ribs and the respective heads G are rings of packing $g'$ to form a tight joint. The packing is made to fit tight around the spout, and therefore remains stationary and slides on the face of the revolving head; also, saucer-shaped rings of packing $d^3$ are placed between the outer ends of the spouts and the respective contiguous boxes c, so that substantially these joints are air-tight. Short arms or studs H are secured to the cylinder and extend radially from the apex of the ridges at various points to support the light bands h, that are arranged at suitable intervals along the cylinder for supporting and holding distended the bolting-cloth I, the latter being nailed to the edges of the respective heads G. The bands h are wound with cloth or other suitable soft material to prevent wearing of the bolting-cloth. The material fed into the reel through the spout D of course falls upon the inner surface of the slats F. The inclined openings between these slats are at such an angle with the line of motion that the material at once passes down through these openings and lights on the inner surface of the bolting-cloth, and by reason of the inclination of these openings, which on the ascending side of the reel incline downward and outward, and by reason, also, of the overlapping of the slats F circumferentially, the material cannot again enter inside the slats, but is kept in the narrow annular space between the slats and the bolting-cloth. The reel being slightly inclined, the discharging end being the lowest, the material is fed along the reel by gravity. At the discharging end of the reel, between the disk and head, the slats F are cut away, leaving the slats F' extending beyond the disk and supporting the head G. The slats F' are approximately at right angles to the slats F, and consequently the openings between the slats F' on the ascending side of the reel are downward and inward, by reason of which the tailings are gathered inside the slats. Angular buckets J, usually from four to six in number, or more or less, according to the size of the reel, are arranged between the head G and flange F at this end of the reel and are secured to the head and respectively to a contiguous slat. These buckets elevate the tailings and discharge them into the spout D', through which by means of the internal worm they are conveyed to the discharging-outlet $d'$. The material during its passage through the reel is constantly being carried up by the bolting-cloth, from whence it falls in quantities by its own gravity. The reel should not be run too fast, or the centrifugal force will hold the material against the bolting-cloth and carry it around with the reel. About thirty-eight revolutions per minute for a reel thirty-six inches in diameter is found to be a suitable speed for the reel. With reels that have no core the material as it falls from the bolting-cloth falls to the bottom of the reel and in such quantities that only a portion of the material strikes the bolting-cloth and with such impact that fine dirt is forced through the cloth and coarse particles are wedged into the meshes and more or less obstruct or clog the bolting-cloth. The dirt thus forced through the bolting-cloth injures the flour or lowers its grade. With this class of reels (without cores) the bolting is mostly done at or near the bottom of the reel, and consequently but a small area of the bolting-cloth is doing work at any one time, and this limited surface is continually being more or less clogged by the quantity of material with which it is encumbered. With my improved reel the material that has been carried up by the bolting-cloth as it falls from thence alights upon the cylinder and is divided by the different adjacent ridges into small quantities and spread into thin sheets, and by means of the sloping surfaces of these ridges, co-operating with the centrifugal force of the reel, the material is cast off or deflected back obliquely against the bolting-cloth, again to be elevated by the cloth and again to be cast back from the core upon the cloth. It will be remembered that the bolting-cloth is separated but a short distance from the apices of the ridges, so that the material in passing from the cloth to the ridges, and vice versa, falls but a short distance. Therefore a gentle sliding, tumbling, and prolonged and oft-repeated contact of all the material with the bolting-cloth is had, the result of which is that a large amount of work is accomplished and the work is done in a superior manner.

The conveyer-box B has two conveyers B' and $B^2$, arranged side by side, but separated by a partition $b$, the upper edge of which is chamfered from either side to a narrow edge at the top. On the conveyer-shafts, outside the casing, are respectively mounted the sprocket-wheels K, that are driven by a chain $k$ from the sprocket-wheel $C^3$ aforesaid. Two sets of holes are bored in each conveyer-shaft for the wings $b'$. (See Fig. 3). These holes run spirally in either direction around the respective conveyer-shafts, by means of which the wings may be set to make right-handed or left-handed conveyers, according to which end of the conveyer-box it is desired to locate the discharging-outlet. If preferred, the wings may be set right and left handed on the respective ends of the same shaft, so as to discharge at the center or at any desired point between the extremes.

Directly above the partition $b$ of the conveyer-box and spanning the opening from above are located a series of bridges L, that support the cut-off slides M and cover the joints between these slides. These bridges and slides are of sheet metal, usually tin, and are constructed and arranged as follows: For the bridges strips of tin along the center line of each are bent double, or nearly so, and the edges are bent up inside, forming ways $l$. (See Figs. 5 and 7.) The walls $A^2$ are notched along the under edges to receive the bridges L, and portions of the respective ends of the latter $l'$ are flanged back and secured to the respective walls $A^2$ on the outside of the latter, leaving the ways $l$ depending below the walls $A^2$. The slides M have flat sides, between which is secured the angular bottom plate $m$, that is bent approximately at a right angle, more or less, with the apex located near the upper edges of the sides and the ends of the bottom plate extending some distance below the side plates. The upper edges of the side plates are bent down inside at $m'$, and these hook edges slide in the respective ways $l$ of the bridges L, so that the legs of a bridge support the respective sides of two adjacent slides, the bridges of course covering the joints between such slides, and prevent any leakage through the cracks. When the parts are assembled, the projecting ends of the angular bottom plates extend down on either side of the ridge of the partition $b$, (see Figs. 4 and 10,) and these ends by contact with the partition form stops that limit the movement of the slides in either direction. If a slide is moved to the limit of its throw to the one side, it covers the opening to the conveyer located on that side and exposes the opening to the opposite conveyer. These cut-off slides, by means of the handles $M'$, may therefore be adjusted to the one side or the other, so as to conduct the flour that falls upon the area of such slide into the one conveyer or the other, as desired; or the slide may be left midway, so as to conduct the flour about equally to both conveyers. The best part of the flour is most readily sifted through the bolting-cloth, and any dirt or refuse that may pass the bolting-cloth is usually found toward the lower end of the conveyer. By manipulating the cut-off slides the better grades of flour may be discharged into one conveyer, and the poor grades toward the discharge or tail end of the reel may be discharged into the other conveyer, and the two grades are thus kept separated; also, if a hole is found in the bolting-cloth, where the best quality of flour is being taken off, the slide or slides on which the material passing through such hole would fall may be shifted to throw the unbolted product in with the second grade of flour until such time as the reel can be stopped and repaired. These and other manipulations that may be had render the two conveyers and the cut-off slides a valuable auxiliary to the reel.

A revolving brush P is made to sweep the reel from the outside. The brush-shaft passes out through the casing and has mounted thereon the sprocket-wheel $P'$, connected by an endless chain $p$ with the sprocket-wheel $C^2$. The reel can be made to do more work if in addition to the operation had on the ascending side of the reel, already described, a portion of the material is carried over the reel and dashed against the bolting-cloth on the descending side thereof. The objection to this usage is that the impact of the material against the descending side of the reel is likely to be too violent and to force dirt through the bolting-cloth, and consequently to deteriorate or lower the grade of flour. Such usage is therefore not recommended.

I have found by actual experiment that from the same material and from the same bolting-reel of flour simultaneously bolted, respectively from the ascending and descending sides of the reel, the latter will contain more dirt than the former, and consequently be of an inferior grade or quality, and that there will be a marked difference in the two grades of flour; but in case more work is forced upon the reel than can be done on the ascending side thereof strips $r$ are provided, which are usually attached to alternate ridges, as shown in Fig. 10. These strips, by projecting above the apices of the ridges on the ascending side, form with the top surfaces of the connected ridges what might be called "buckets." These buckets contain more or less material and carry it over the reel with the result as aforesaid. These strips $r$ are secured by wood-screws, so that they are easily attached and detached, and in shipping the machines these strips are left off and are only attached or used when absolutely necessary. I emphatically recommend that bolting-reels of such capacity be employed that the bolting can all be done on the ascending side of the reel.

What I claim is—

1. In a bolting-reel, the combination, with a reel-core the periphery of which is made up of a series of longitudinal V-shaped ridges constructed to cast off the material onto the ascending side of the bolting-cloth, of the bolting-cloth encircling the core in cylindrical form and located in near proximity to the apices of the ridges, substantially as set forth.

2. In a bolting-reel, the combination of the heads, disks located between the heads, slats secured on the disks and extending to the heads and forming a closed core or cylinder between the disks, the said slats being set at an angle to deflect or cast off the material onto the ascending side of the bolting-cloth, and a feeding-spout adapted to discharge the material into the space between the head and disk at the feeding end of the machine, substantially as set forth.

3. In a bolting-reel, the combination of the heads, disks, and slats secured on the disks and extending to the heads and forming a closed core or cylinder between the disks, and a feeding-spout arranged to feed the material to the reel, the said slats being separated near the feeding end of the reel for the escape of the material and arranged obliquely with the line of motion, the direction of such obliquity on the ascending side of the reel being downward and outward, substantially as set forth.

4. In a bolting-reel, the combination of two heads, two disks, slats secured on the disks and extending to the heads and forming a closed core or cylinder between the disks, a bolting-cloth encircling the slats, mechanism for feeding the material to the interior of the reel, and the angular deflecting-boards located within the reel for discharging the tailings.

5. In a bolting-reel, the combination of two heads, two disks, oblique deflecting-slats secured on the disks and extending to the heads and forming a closed core or cylinder between the disks, the said slats being separated near opposite ends of the machine for the escape of the material onto the bolting-cloth and for the discharge of the tailings, respectively, and the bolting-cloth encircling the slats.

6. In a bolting-reel, the combination, with reel-heads having central openings and feed-spouts extending through said openings, of annular external ribs or flanges on the respective spouts, and the saucer-shaped rings $g'$ of packing, located between the respective ribs and the respective reel-heads, substantially as set forth.

7. The combination, with a reel and two conveyers located below the same, of the inverted-V-shaped bridges L, having upwardly-bent ends forming ways for the slides, and the slides having the angular or double-inclined bottom and provided with flanges or lips adapted to overlap the bent ends of the bridges, substantially as set forth.

In testimony whereof I sign this specification, in the presence of two witnesses, this 2d day of September, 1885.

JONATHAN MILLS.

Witnesses:
CHAS. H. DORER,
ALBERT E. LYNCH.